(No Model.)
V. N. NOEL.
ANIMAL POKE.
No. 598,740. Patented Feb. 8, 1898.
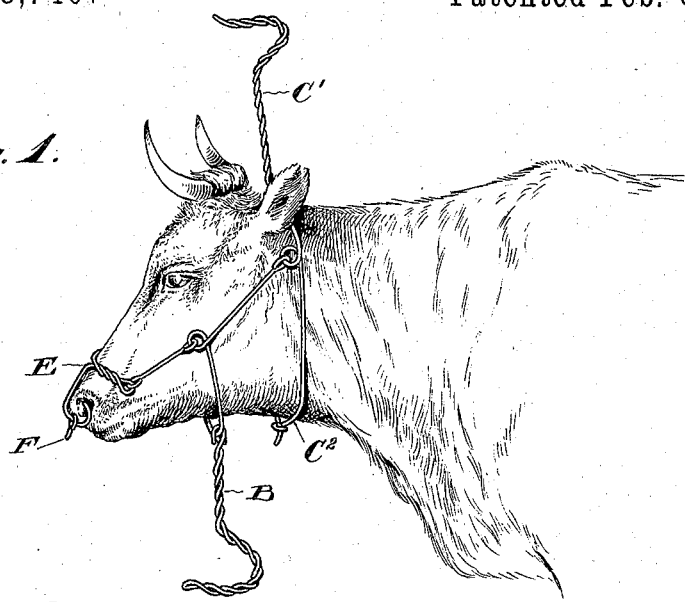
Fig. 1.
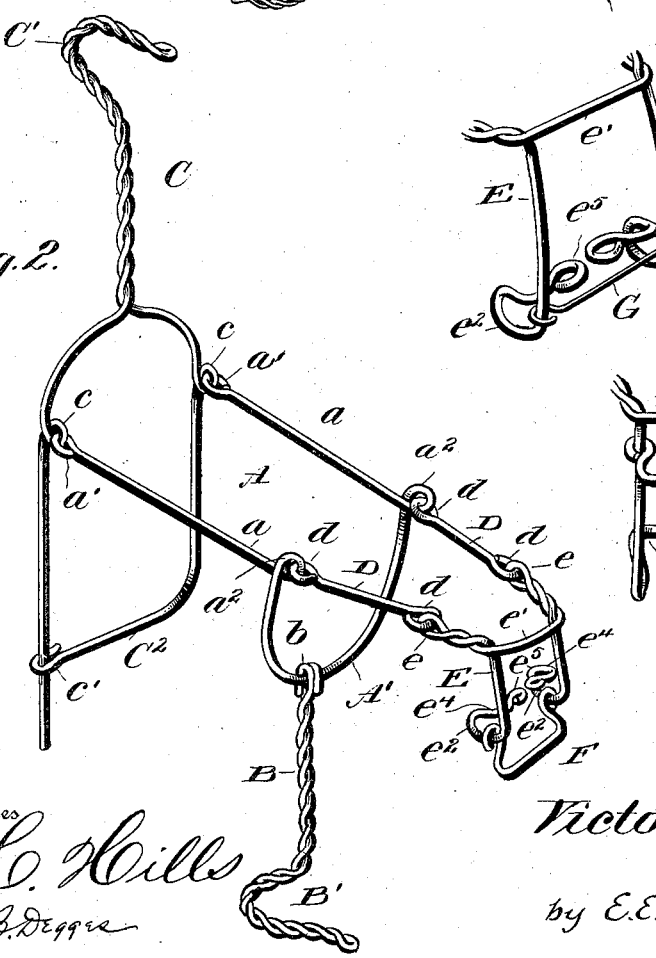
Fig. 2.
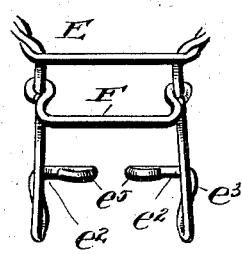
Fig. 4.
Fig. 3.
Witnesses
L. C. Hills
A. B. Diggs
Inventor:
Victor N. Noel,
by E. E. Masson Attorney

UNITED STATES PATENT OFFICE.

VICTOR N. NOEL, OF JEFFERSON, OKLAHOMA TERRITORY.

ANIMAL-POKE.

SPECIFICATION forming part of Letters Patent No. 598,740, dated February 8, 1898.

Application filed September 1, 1897. Serial No. 650,287. (No model.)

*To all whom it may concern:*

Be it known that I, VICTOR N. NOEL, a citizen of the United States, residing at Jefferson, in the county of Grant, Territory of Oklahoma, have invented certain new and useful Improvements in Animal-Pokes; and I do hereby declare the following to be a full, clear, and exact description of the invention, such as will enable others skilled in the art to which it appertains to make and use the same.

This invention relates to certain new and useful improvements in animal-pokes of that class formed of wire and having provisions for affixing it about the head of the animal and clamping it on the nose.

It pertains to that class of pokes in which there is a plurality of hooks designed to engage the wires of a wire fence or a hedge or other barrier, so as to cause the arms or other portions of the device to so pull upon the animal as to cause the animal to stop its movements by giving it severe pain.

The present invention has for its object, among others, to provide a simple and cheap device of this character that can be readily applied and quickly secured in position and having its hooks arranged in different vertical planes, so as to exert a strain upon opposite sides of the mid-length of the side bars that are disposed upon opposite sides of the animal's head. The lower one of these hooks is mounted to slide upon a substantially semicircular portion of the body part of the poke, so as to hang substantially vertically regardless of the position assumed by the head of the animal. The clamping means also are of novel construction, as is the poke as a whole. I aim at simplicity, as well as durability and efficiency.

The above ends I attain by means of the construction hereinafter set forth and the novel arrangement of the parts thereof.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a perspective view of my poke complete, showing its application to the head of an animal. Fig. 2 is a perspective view, on an enlarged scale, of the improvement. Fig. 3 is an end elevation of the clamping end, showing the clamp-bar in its uppermost position. Fig. 4 is a perspective view showing a modified form of clamp.

Like letters of reference indicate like parts throughout the several views.

Referring now to the details of the drawings by letter, A designates the body portion of the device, formed, preferably, of a single piece of wire and comprising the side bars $a$ $a$, the rear ends of which are formed into eyes or the like $a'$ $a'$, while their forward ends are bent to form the eyes or loops $a^2$ $a^2$, the wire bent downward upon the outside of the side bars and forming the vertically-disposed curved bar or portion $A'$.

B is a rod or arm formed of wire, preferably twisted, as seen in Figs. 1 and 2, being bent upon itself at or near its center to form the hook $B'$, which is designed to extend with its open side forward, while its ends are bent in opposite directions to form a split ring or hook, which is designed to be engaged over the curved portion $A'$ of the main part of the device. The connection between this rod and the curved part is such as to allow the arm and its hook to move freely upon the curved portion, so that the arm may extend vertically no matter what may be the position assumed by the head of the animal. It is evident that the form of hook or ring $b$ may be varied from that herein shown and still accomplish the same result.

Disposed at right angles to the main portion A is the upper arm or rod C, bent to form a thoroughly sufficiently strong yet light upper hook $C'$, which, it will be observed, is in a different vertical plane from the lower hook. The wire forming this arm and hook is twisted, as shown, and from the lower end of the twist the wire is arched, and at points opposite the rear ends of the side bars $a$ the wire is formed with the eyes or loops $c$, which are interengaged with the eyes or loops $a'$ of the side bars, and the wire is then extended downward to form the throat-latch $C^2$, one portion of the wire being extended downward and thence horizontally and formed with an open eye or hook $c'$, into which the other vertical portion of the wire is engaged and there held by pinching or compressing the said hook in a manner that will be readily understood.

D are short wires formed at each end with eyes or rings $d$, and these wires or links are pivotally connected by means of such eyes with the eyes $a^2$ of the side bars of the body portion of the poke, as seen best in Fig. 2.

The nose-clamping portion E of the device is pivotally suspended from the forward ends of the wires or links D and is of peculiar construction. It is composed of a piece of wire bent to form the eyes $e$, that are pivotally engaged in the eyes at the forward ends of the wires or links D, the wire being twisted, as seen best in Fig. 2, the central portion of the wire being formed into the cross-bar $e'$ and the ends of the wire being extended at substantially right angles thereto and thence rearward, as seen at $e^2$, thence upwardly, as at $e^3$, thence forwardly, as at $e^4$, and then inwardly toward each other, where they are bent to form the clamping rings or eyes $e^5$, which are designed to engage in the nostrils of the animal, as shown in Fig. 1. F is a clamping-bar mounted to slide on the vertical portions of this clamping-piece E, as seen in Figs. 2 and 3, which vertical portions are normally slightly divergent, as seen in Fig. 3, so that when the clamping-bar is in its uppermost position, as seen in Fig. 3, the clamping-eyes will be separated, but when the clamping-bar is forced downward the lower ends of the divergent vertical bars are drawn together, so that the clamping eyes or rings will be drawn together and firmly pressed against the nostrils of the animal in a manner that will be readily understood.

With the parts constructed and arranged substantially as hereinbefore described the mode of application and the operation will be readily understood, especially when taken in connection with the annexed drawings, and a further detailed description does not seem necessary. The position assumed by the various parts is clearly illustrated in Fig. 1.

In Fig. 4 I have shown a modified form of means for holding the clamping rings or eyes against the nostrils of the animal. In this view, in lieu of the clamping-bar F, I have shown a sharpened wire or needle G, one end of which is engaged with one of the vertical portions of the part E, while the other end, being sharpened, is designed to be forced through the gristly part of the nose of the animal and then bent around the other vertical portion of the part E, as indicated, so as to firmly hold the clamping portion on the nose. This I consider a full equivalent of the movable clamping-bar shown in the other views.

Modifications in detail may be resorted to without departing from the spirit of the invention or sacrificing any of its advantages.

What is claimed as new is—

1. An animal-poke comprising a throat-latch carrying a vertical arm with hook, a body portion pivotally connected with the throat-latch and having an integral vertically-disposed curved portion substantially parallel with the throat-latch, a hooked arm movably mounted on said curved portion, a downwardly-extending portion pivotally supported from the outer end of the body portion and bent to form a part of a clamping device to engage the nose of the animal, substantially as shown and described.

2. An animal-poke consisting of the throat-latch with upwardly-extending hooked arm, a body portion pivotally connected with the said latch and terminating at its forward portion in an integral downwardly-extending curved portion, a hooked arm pivotally supported from the curved portion, links pivotally connected with the forward end of the body portion at its junction with the curved part, and a nose-clamping portion pivotally suspended from the forward ends of said links, all substantially as shown and described.

In testimony whereof I affix my signature in presence of two witnesses.

VICTOR N. NOEL.

Witnesses:
W. S. JONES,
H. W. MELIA.